W. H. MAIN.
Revolving Harrow.

No. {809, 31,813.}

Patented Mar. 26, 1861.

Witnesses:

Inventor:
William H. Main

UNITED STATES PATENT OFFICE.

WILLIAM H. MAIN, OF LIVERPOOL, OHIO.

IMPROVEMENT IN ROTARY HARROWS.

Specification forming part of Letters Patent No. 31,813, dated March 26, 1861.

*To all whom it may concern:*

Be it known that I, WILLIAM H. MAIN, of Liverpool, in the county of Medina and State of Ohio, have invented new and useful Improvements in Rotary Harrows; and I do hereby declare that the following is a full and complete description of the construction and operation of the same, reference being had to the accompanying drawings, making part of this specification, in which—

Figure 1:
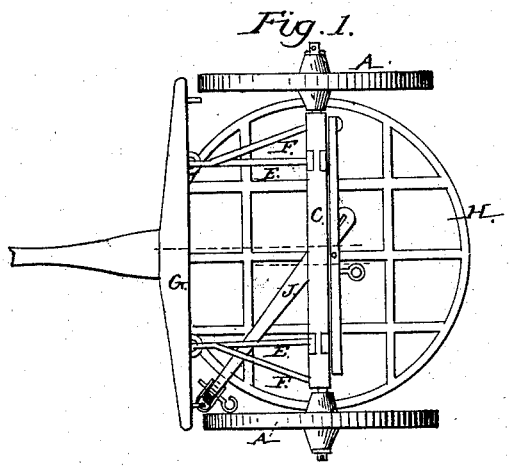
Figure 2:
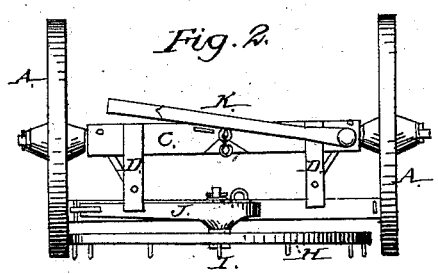
Figure 3:
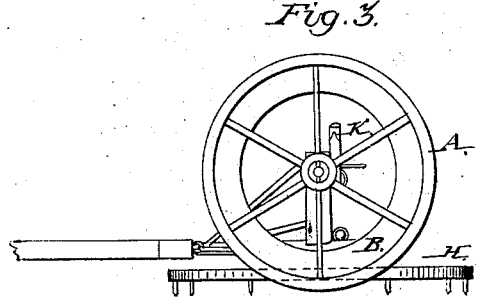
Figure 4:
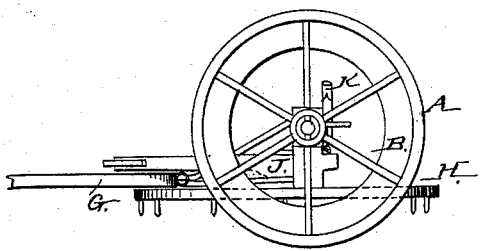

Figure 1 is a top view. Fig. 2 is an end view. Fig. 3 is a side view; and Fig. 4 is the same with the harrow suspended for convenience of moving to and from the field.

Like letters refer to like parts.

In the several figures, A A represent the upright wheels. These may be made, like the common wagon-wheels, with a wide felly, or a circular rim may be placed upon the spokes inside, as seen at B in Figs. 3 and 4. The wheels A are provided with an axle-tree, C, from which project the arms D D, from which the rods E and braces F extend forward to the cross-bar G, to which the neap is attached. By this means the line of the draft can be brought near the ground.

The harrow is made with its circumference a complete circle, with an upright center pin, I, projecting upward from the center, to which the draft-bar J is attached. This bar is hitched by a clevis or hook to either end of the cross-bar G, thus giving an oblique line of draft to the harrow, by which means there is a constant side draft against the felly of one or other of the upright wheels, dependent upon the end of the cross-bar to which the draw-bar is hitched, and this side pressure of the harrow against the upright wheel causes the harrow to revolve or rotate upon the pin I in concert with the rotation of the upright wheels.

The draw-bar J can be hitched to either end of the cross-bar, and this will determine the direction of rotation.

For the purpose of moving the harrow to and from the field, I suspend it by means of the lever K, in which position it is seen in Fig. 4.

I disclaim the use of cog-gear upon the periphery of the harrow, and also upon the fellies of the wheel, being aware that these devices have been before used in similar situations; but

What I claim as my improvement, and desire to secure by Letters Patent, is—

The arrangement of the levers J and K, cross-bar G, rods E, braces F, arms D, harrow H, and wheels A, the whole being constructed, operated, and operating as and for the purpose described.

WILLIAM H. MAIN.

Witnesses:
S. C. PRICHARD,
GEO. A. DANDO.